United States Patent [19]
Kananen et al.

[11] Patent Number: 6,041,544
[45] Date of Patent: *Mar. 28, 2000

[54] SPECIALITY MUSHROOM SPAWN

[75] Inventors: David L. Kananen, Napoleon, Ohio; Jack A. McDaniel, Macungie, Pa.

[73] Assignee: Vlasic Farms, Inc., Cherry Hill, N.J.

[*] Notice: This patent is subject to a terminal disclaimer.

[21] Appl. No.: 09/134,940

[22] Filed: Aug. 17, 1998

Related U.S. Application Data

[63] Continuation-in-part of application No. 09/027,216, Feb. 20, 1998.

[51] Int. Cl.[7] .............................. A01H 15/00; A01G 1/04
[52] U.S. Cl. .......................................... 47/1.1; 71/5; 71/9
[58] Field of Search .................... 47/1.1; 71/5, 9

[56] References Cited

U.S. PATENT DOCUMENTS

| | | | |
|---|---|---|---|
| 3,560,190 | 2/1971 | Hughes et al. | 71/5 |
| 3,828,470 | 8/1974 | Stoller | 47/1.1 |
| 3,942,969 | 3/1976 | Carroll, Jr. et al. | 71/5 |
| 4,079,543 | 3/1978 | Stoller | 47/1.1 |
| 4,170,842 | 10/1979 | Stoller | 47/1.1 |
| 4,534,781 | 8/1985 | Wu et al. | 71/5 |
| 4,617,047 | 10/1986 | Bretzloff | 71/5 |
| 4,764,199 | 8/1988 | Pratt et al. | 71/5 |
| 4,776,872 | 10/1988 | Mulleavy et al. | 71/5 |
| 4,803,800 | 2/1989 | Romaine et al. | 47/1.1 |
| 4,848,026 | 7/1989 | Dunn-Coleman et al. | 47/1.1 |
| 4,874,419 | 10/1989 | Wu | 71/5 |
| 4,990,173 | 2/1991 | Katz et al. | 71/5 |
| 5,370,714 | 12/1994 | Ogawa et al. | 47/1.1 |
| 5,443,612 | 8/1995 | Havens | 71/5 |
| 5,472,592 | 12/1995 | Romaine et al. | 47/1.1 |
| 5,503,647 | 4/1996 | Dahlberg et al. | 47/1.1 |
| 5,759,223 | 6/1998 | Carlson et al. | 71/5 |

FOREIGN PATENT DOCUMENTS

| | | | |
|---|---|---|---|
| 0 134 081 | 3/1985 | European Pat. Off. | |
| 0 700 884 | 3/1996 | European Pat. Off. | C05F 11/02 |
| 2715268 | 7/1995 | France . | |
| 53-107476 | 9/1978 | Japan | C12K 1/00 |
| 2246566 | 2/1992 | United Kingdom | C05F 17/00 |

OTHER PUBLICATIONS

Rinaldi et al., 1974. The Complete Book of Mushrooms, Crown Publishers, Inc., New York, p. 271.

Chang et al. (Ed), 1978. The Biology and Cultivation of Edible Mushrooms, Academic Press, New York, pp. 244–248.

Kisarov, SU 1242050A, issued Jul. 7, 1986, Derwent, ACC# 1987–063121.

*Primary Examiner*—David T. Fox
*Assistant Examiner*—Anne Marie Grünberg
*Attorney, Agent, or Firm*—Banner & Witcoff, Ltd.

[57] ABSTRACT

A mushroom spawn comprising a mixture of: (a) at least one proteinaceous ingredient in an amount to provide at least 3.5% nitrogen on a dry weight basis; (b) 2 to 30 wt % based on dry weight of paper pellets (c) 5 to 60 wt % based on dry weight of at least one particulate material, (d) a buffer in an amount effective to provide a pH of about 6 to 7.8, and (e) water; and colonized with mushroom mycelium wherein the (b) paper pellets, (c) particulate material, or both in an amount effective to provide at least 10,000 particles per 100 g of finished product.

32 Claims, No Drawings

SPECIALITY MUSHROOM SPAWN

This application is a continuation-in-part of U.S. application Ser. No. 09/027,216, filed Feb. 20, 1998, which is hereby incorporated by reference in its entirety.

TECHNICAL FIELD

The present invention relates to the art of mushroom cultivation and specifically pertains to an improved mushroom spawn that efficiently inoculates the mushroom substrate and provides an improved nutrient source for promoting mushroom growth. This invention also relates to the art of cultivating and inoculating other microorganisms into various substrates in order to maximize the survival and inoculation efficiency of the microorganisms.

BACKGROUND OF THE INVENTION

Edible mushrooms are cultivated throughout the world. Although the American consumer is most familiar with the white button mushroom (*Agaricus bisporus*), many other types of mushrooms are also cultivated and are often more popular than Agaricus. These non-Agaricus mushrooms are often collectively referred to as "specialty" or "exotic" mushrooms. Table 1 lists many, but not necessarily all, specialty mushroom types currently or potentially grown commercially. In some cases, "potentially grown" reflects no more than a desire to cultivate the mushroom.

TABLE 1

Specialty mushrooms currently or potentially grown commercially

Agaricus bitorquis
Agrocybe aegerita
Amanita spp.
Armillaria mellea
Auricularia spp.
Boletus spp.
Cantharellus cibarius
Collybia fusipes
Coprinus spp.
Flammulina velutipes
Ganoderma lucidum
Grifola frondosa
Hericium erinaceus
Hydnum repandum
Hypsizygus marmoreus
Kuehneromyces mutabilis
Lactarius spp.
Lentinula edodes
Lepiota spp.
Lyophyllum georgii
Marasmius oreades
Morchella spp.
Pleurotus spp.
Pholiota spp.
Plicaria muralis
Psalliota spp.
Rhodopaxillus spp.
Russula virescens
Stropharia rugoso annulata
Tremella fuciformis
Trichloma matsutake
Tuber spp.
Volvariella spp.
Peziza aurantia The commercial production of mushrooms involves a series of steps, with the specific details and sequence of steps depending on the genus and species being cultivated. Details of specialty mushroom cultivation methods are given in many publications, including for example Chang & Hayes, 1976; Stamets & Chilton, 1983; Chang & Miles, 1989; Royse, 1997. Many specialty mushroom cultivation systems employ sawdust, straw, or waste wood substrates. An example of specialty mushroom production methods is found with the Shiitake mushroom (*Lentinula edodes*).

The traditional production method for Shiitake involves cultivation on natural hardwood logs. Freshly cut or over-wintered logs are cut to convenient lengths, and holes are drilled at various locations in the logs. Wood spawn plugs are inserted in the holes and sealed with paraffin, and logs are incubated for 6 to 9 months. Wood spawn plugs consist of hardwood dowels that are moistened, sterilized, and inoculated with pure cultures of *Leninula edodes*. Following complete colonization of the plugs by the mycelium, they are ready for use. Alternately, the holes are packed with sawdust spawn (see below) and sealed with paraffin. Induction of mushroom production occurs by soaking the logs in water or mechanical agitation of the logs. Mushrooms are formed from primordia on the surface of the logs, and fruiting can continue for months or years.

A more modern and efficient method of Shiitake mushroom production is on "synthetic" or "sawdust" logs. In this technology, hardwood sawdust is mixed with additional nutrients (wheat bran, rice bran, millet, rye, corn, etc.), adjusted to ca. 60% moisture content, filled into autoclavable plastic bags, and subjected to steam sterilization. Once cooled, the substrate is inoculated with grain or sawdust Shiitake spawn (see below) and incubated to allow thorough colonization of the substrate with the Lentinula mycelium. During the growth process, the Lentinula mycelium knits the substrate together to form a firm block structure. Mushroom production is initiated by removing the bags, watering, mechanically agitating, illuminating, or other treatment. Mushrooms can be produced as soon as ca. 40 days after the initiation of the process. The use of the synthetic logs is substantially more efficient than natural logs in terms of space utilization, and total mushroom yields are significantly higher. Shiitake mushrooms have also been produced on a composted substrate filled into large wooden trays (not unlike the Agaricus production process, U.S. Pat. No. 4,874, 419), but this method has not gained wide acceptance.

The cultivation of most other specialty mushroom types generally represent variations on the methods of cultivation of Shiitake on sawdust blocks. For example, Auricukiha spp. is grown on a sterilized substrate of sawdust, cottonseed hulls, bran, and/or cereal grains. *Flammulina velutipes* is cultivated in bottles on a sterilized substrate of sawdust and rice bran. *Grifola frondosa* is cultivated in bottles or plastic bags on sterilized or pasteurized sawdust plus rice or wheat bran. Pleurotus spp. is cultivated on pasteurized or sterilized chopped wheat straw and/or cottonseed hulls filled into plastic bags, bottles, mesh bags, wooden or plastic trays, etc. *Pholiota nameko* is produced in bottles containing sterilized sawdust and rice bran. Volvariella spp. is cultivated on a variety of pasteurized agricultural wastes.

A common and critically important step in the cultivation of all mushroom types is the inoculation of the substrate with vegetative mycelia of the mushroom being grown. This is typically referred to as spawning, and the inoculum is referred to as mushroom spawn. The ideal mushroom spawn contains high levels of viable mushroom mycelium and sufficient nutrients to maintain viability of the mycelia during storage of the spawn. The spawn should also contain sufficient nutrients to allow growth from the spawn substrate onto the mushroom growing substrate. Specialty mushrooms are typically inoculated with either grain spawn, sawdust spawn, or more rarely, perlite spawn or liquid inoculation methods.

The technology for making grain based mushroom spawn was first taught by Sinden (U.S. Pat. No. 1,869,517) for the cultivation of *Agaricus bisporus*. Spawn is generally made from sterilized grain that is inoculated with pure cultures of the desired mushroom strain. Mushroom spawn can be prepared by several methods. In one method, dry grain (rye, millet, wheat, sorghum, or other grain), water, $CaCO_3$, and (optionally) $CaSO_4$ are placed in suitable containers and capped with lids that allow passage of air and steam but do not allow the passage of microbes that would contaminate the finished product. Containers are subject to steam sterilization for times and temperatures suitable to render the mixtures commercially sterile. Following cooling, the grain mixture is inoculated with a starter culture of the desired mushroom strain, and incubated under permissive conditions to allow complete colonization of the substrate. Containers are shaken at specific intervals to promote even colonization of the mycelium throughout the mixture. Following complete colonization of the hydrated, sterile grain with the mushroom fungus, the spawn can be used immediately to inoculate the mushroom substrate. The mixtures can also be transferred to plastic bags and refrigerated or refrigerated in the production bottle in anticipation of spawning at a future date. Rye grain spawn (the most commonly used) contains about 2.3 wt % nitrogen on a dry weight basis. The moisture content is optimized for the specific mushroom fungus being cultivated.

An alternate method of grain spawn production involves bulk cooking of grain in large kettles. Grain and water mixtures are heated to hydrate the grain. After draining excess water, the hydrated grain is mixed with $CaCO_3$ and $CaSO_4$, filled into bottles or heat resistant plastic bags, sterilized, cooled, inoculated with starter cultures of the desired mushroom strain, and incubated to allow colonization of the grain with the mycelium.

Another method of grain spawn production involves placing grain, water, $CaCO_3$, and $CaSO_4$ into steam jacketed mixers. Mixtures are cooked, sterilized, cooled, and inoculated in the mixers. The inoculated sterile grain is aseptically transferred to sterile plastic bags that are ventilated to allow passage of air while maintaining sterility. Following mycelial growth, spawn can be shipped to mushroom production facilities with minimal further handling of the product.

Sawdust spawn can be prepared from a variety of ingredients, depending on local availability. A typical formula (Stamets & Chilton, 1983) is to mix four parts of hardwood sawdust with one part rice or wheat bran. The mixture is soaked in water overnight, drained, filled into bottles and autoclaved to render the mixture commercially sterile. The sterile mixture can be inoculated from agar cultures of the desired mushroom fungus, from sawdust or grain spawn, or from a liquid culture. One advantage of sawdust spawn is that the mushroom mycelium grows on a substrate that is chemically and physically similar to the substrate used for cultivation, thus avoiding physiological changes when the spawn is used to inoculate production containers. A disadvantage of sawdust spawn is that it tends to form clumps that make handling of the spawn difficult. Clumping of spawn also results in a heterogeneous distribution of inoculum in the production substrate, causing inconsistencies in mycelial growth. Sawdust spawn typically contains very low levels of nitrogen.

Perlite spawn is based on a formula reported by Fritsche (1978) and first described by Lemke (1971) for spawn on a perlite substrate. The formula is as follows: perlite (1450 g), wheat bran (1650 g), $CaSO_4$ $2H_2O$ (200 g), $CaCO_3$ (50 g), water (6650 ml). The pH after sterilization is 6.2 to 6.4. This formula is calculated to contain 1.10 to 1.34% nitrogen on a dry weight basis (assuming a typical nitrogen content of wheat bran of 2.24 to 2.72%).

Liquid spawn is made from either agar plate cultures or broth cultures of the desired mushroom fungus. Agar or broth cultures are aseptically transferred to sterile water in a sterile blender jar. The cultures are blended briefly to macerate the mycelium, and the resulting mycelial slurry is used to inoculate production units via pipet or syringe. A distinct advantage of the liquid spawn method is that the very large number of mycelial fragments results in very efficient inoculation. A disadvantage of the method is the difficulty in maintaining aseptic conditions during preparation on the inoculum.

Stoller (U.S. Pat. No. 3,828,470) teaches that *Agaricus bisporus* mushroom mycelium will not grow on feedstuffs such as cottonseed meal, soybean meal, etc., when used alone as an autoclaved substrate. He also teaches Agaricus spawn in which the cereal substrate has been diluted with an inorganic material containing calcium carbonate or an organic flocculating agent. Nitrogen contents are generally low. For example, Stoller's example 16 is estimated to contain about 0.22% nitrogen. Stoller's example 18 is estimated to contain about 0.7% nitrogen. Stoller also teaches that a fine, granular or powdery spawn is preferable to the large, whole grain particles of grain spawn. This is generally due to the number of "points of inoculum" per unit weight of spawn. There is no indication that Stoller's teachings have ever been used for the production of specialty mushroom spawn.

Brini & Sartor (European Patent Application EP 0 700 884 A1) teach a mixture of a water retaining-dispersing agent (e.g., peat), a buffer, a protein containing component (e.g. soybean meal), a growth promoting component (e.g. corn gluten and/or corn starch), and water. The mixture is sterilized, inoculated with the mushroom fungus, and used to spawn compost for the cultivation of *Agaricus bisporus* mushrooms. The formulation inoculates the mushroom beds and adds protein, while eliminating residual antimicrobial substances and suppressing the growth of antagonistic molds. Moisture contents of the mixtures are typically 54 to 60%, and the formulations typically contain about 9,000 particles per 100 g. Protein contents of the mixtures are 4 to 20 wt % protein. Use of the mixtures as mushroom spawn is asserted to allow the faster growth of the mushroom and prevent the growth of molds. However, routine experimentation has shown that the mixtures taught by Brini & Sartor tend to form clumps, resulting in incomplete sterilization and areas within the mixtures that are not completely colonized by the *Agaricus bisporus* mycelium. The failure to achieve sterilization results in an economic loss, while a poorly colonized mixture can allow the growth of competitor molds and bacteria in the compost, causing high compost temperatures and reducing mushroom yield.

Romaine (U.S. Pat. No. 4,803,800) teaches production of an *Agaricus biporus* mushroom casing spawn by encapsulation of nutrients in a hydrogel polymer. Casing spawn is used to inoculate the Agaricus mushroom casing layer rather than the compost. Use of casing spawn speeds fruiting. Specialty mushrooms generally neither require a casing layer not benefit from its use, so this technology is not germane to the present invention. This information is cited here because casing spawn can potentially be used as a substrate spawn. Nitrogen contents in the Romaine casing spawn are generally low. For example, Romaine teaches total nutrient levels of 2 to 6% (wt/vol of formula). Assuming the use of 100% protein as the nutrient source, total nitrogen would be about 0.96 %. Some of Romaine's formulas contain Perlite, vermiculite, soy grits, or similar materials at about 2 to 6% (wt/vol) of the formula as texturizing agents.

Dahlberg & LaPolt (U.S. Pat. No. 5,503,647) teach the development of an *Agaricus bisporus* mushroom casing spawn prepared from nutritionally inert particles (calcined earth, vermiculite, Perlite, etc) amended with nutrients. Again, specialty mushrooms generally neither require a casing layer not benefit from its use, so this technology is not germane to the present invention. This information is cited here because casing spawn can potentially be used as a substrate spawn. The casing spawn is formulated with low nitrogen contents (generally less than 1%) to allow inoculation of the mushroom casing layer with *Agaricus bisporus* mycelium without promoting the growth of pests and pathogens. Dahlberg & LaPolt also teach that high levels of proteinaceous ingredients such as soybean fines, etc. are inhibitory to *Agaricus bisporus* growth. Generally, nitrogen levels above about 2% in a casing spawn formula result in reduced growth of *Agaricus bisporus* mycelium. This casing spawn formulation is also proposed as a substrate for inoculation of spawn during its preparation.

Some specialty mushroom substrates are also nutritionally amended by the addition of supplements during the spawning process. A mushroom supplement is distinguished from a nutrient ingredient of the substrate in that a supplement is added during the spawning process, after pasteurization. Because the supplements are not sterilized, they are only used in substrates that are pasteuried. In practice, this limits their use to cultivation of Pleurotus, Grifola, Volvariella, and other species that can tolerate a non-sterile substrate. Mushroom supplements are generally made from soybean (i.e., soybean meal, cracked soybeans, etc.), corn (corn gluten), and other agricultural materials. Their addition to a non-sterile mushroom substrate can result in high temperatures that are detrimental to the growth of mushroom mycelia and/or can allow the growth of competitor molds. Supplements are subjected to a variety of treatments to avoid high temperatures and mold growth. These treatments include heat, formaldehyde, fungicides or other mold inhibitory formulations, hydrophobic or hydrophilic coatings, and others (U.S. Pat. Nos. 3,942,969; 4,534,781; 4,617,047; 4,764,199; 5,291,685; 5,427,592). The treatments required to prevent high temperatures and/or mold growth can represent an economic disadvantage and may also raise safety and environmental concerns.

SUMMARY OF THE INVENTION

It is an object of the present invention to provide a formulated mushroom spawn to inoculate mushroom growing substrates to provide performance at least equivalent to existing mushroom spawn formulas in the time to full colonization of the substrate.

It is a further object of this invention to provide a formulated mushroom spawn with small particles to provide the maximum number of points of inoculum in the mushroom substrate to reduce the time for full colonization of the substrate.

It is a further object of this invention to provide a formulated mushroom spawn with a high content of nutrients to reduce or eliminate the need to separately add a mushroom nutrient supplement.

It is a further object of this invention to provide supplementary nutrients to the mushroom substrate without a resultant detrimental increase in substrate temperature.

It is yet another object of this invention to provide supplementary nutrients to the mushroom substrate without the need to treat the nutrients with pesticides, denaturants, or other chemical or physical treatments to eliminate the growth of competing microorganisms.

It is yet another object of this invention to provide a formulated mushroom spawn that reduces the risks of sterilization failure and incomplete colonization of the mixtures by improving aeration of the mixtures and reducing the formation of clumps.

These and other objects are met by the present invention which comprises an improved mushroom spawn which is formulated with mixtures of: (a) proteinaceous ingredients such as corn gluten, feather meal, cracked soybeans, soybean meal, cottonseed meal, or other ingredient to provide a high nutrient content; (b) pelleted, shredded waste paper to provide multiple points of inoculum and water holding capacity; (c) particulate materials such as calcined earth, vermiculite, Perlite, or similar material to provide multiple points of inoculum, water holding capacity, aeration of mixtures, density, and a free flowing character to the mixtures, (d) calcium carbonate ($CaCO_3$) to neutralize pH, (e) optionally, gypsum ($CaSO_4.2\ H_2O$) to reduce clumping, and (f) water, wherein the (b) paper pellets, (c) particulate material, or both in an amount effective to provide at least 20,000 particles per 100 g of finished product.

The spawn may optionally contain a fraction of grain (i.e., rye, millet, wheat) as used in the prior art. Oleaginous ingredients such as various vegetable oils may be added to increase the total nutrient content of the spawn. The proteinaceous and oleaginous components of the spawn can be combined by using ingredients such as whole cracked soybeans which contain both protein and oil.

Mushroom spawn according to the invention generally contains (on a dry weight basis): 5 to 80 wt % proteinaceous ingredient, 2 to 30 wt % pelleted shredded waste paper, 5 to 60 wt % particulate material, 1 to 10 wt % $CaCO_3$, 1 to 10 wt % $CaSO_4$. Water is added to between 40 and 54%. If used, grain is added at 1 to 50 wt % (dry weight basis). Mixtures are sterilized, inoculated, and incubated in a manner consistent with the prior art.

The improved specialty mushroom spawn is generally used to inoculate mushroom substrate at rates between 1 and 8 % (fresh weight supplement/dry weight substrate). When prepared and used as disclosed herein, the mushroom spawn reduces the time to achieve fulll colonization of the substrate and provides unexpected increases in mushroom yield and production efficiency. Spawn used at 4 to 5 wt % supports a mushroom yield at least equivalent to the use of 3 wt % rye spawn and 4 wt % mushroom supplement (e.g., Campbell's Fresh S41 and S44 formulas). Use of traditional mushroom supplements in addition to the spawn may further improve mushroom yield. Addition of small amounts (i.e., 2%) of traditional supplements generally do not contribute significantly to substrate heating.

The invention provides a fully functional formulated mushroom spawn and mushroom supplement in a single ingredient. Because the spawn as disclosed is heavily colonized with mushroom mycelium, most foreign microorganisms cannot grow well on the material. Therefore, the invention also provides a mushroom supplement containing no pesticides, denaturants, or other chemical or physical treatments to control the growth of competing microorganisms and avoids deleterious increases in the temperature of non-sterile substrates.

The invention as disclosed differs from Perlite spawn as taught by Lemke (1971) and Fritsche (1978) in that the nutrient content of the spawn, especially the protein nitrogen content, is maximized. Typical nitrogen contents of the spawn are approximately four-fold to five-fold higher than of Perlite spawn. During the course of investigations leading to the development of spawn-supplement, many formulations were developed that represent functional "non-grain spawns." The generally low nutrient contents of the non-grain spawns require that traditional mushroom supplements be added to the substrate to achieve maximum mushroom yields.

The invention as disclosed also differs from the spawn described by Brini & Sartor in that the moisture contents are substantially lower, minimizing the formation of clumps that lead to sterilization failure and uncolonized areas of the mixtures. The present invention also contains particulate ingredients that improve steam penetration during sterilization and further minimize sterilization failure. The present invention also has significantly more particles per 100 g than the Brini & Sartor formulation, resulting in improved inoculation efficiencies.

DETAILED DESCRIPTION

As disclosed, the present invention comprises a formulated specialty mushroom spawn with sufficiently high nutrient content that addition of supplementary nutrient formulations (i.e., mushroom supplement) is unnecessary. Mixtures of proteinaceous ingredients (corn gluten, soybean meal, feather meal, wheat bran, etc.) and/or oleaginous ingredients (cracked soybeans, soybean fines, soybean oil, corn oil, etc.), pelleted shredded waste paper composition, particulate materials to improve water holding capacity and aerate the mixture (calcined earth, vermiculite, Perlite, etc.), $CaCO_3$, $CaSO_4 \cdot 2H_2O$ (optional), and water are prepared, steam sterilized, inoculated with starter cultures of the desired mushroom fungus, and incubated at permissive conditions. After incubation to allow colonization of the spawn by the mushroom mycelium, the spawn is used to inoculate the mushroom substrate in a manner equivalent to the prior art for mushroom spawn and mushroom supplement. Addition of small amounts of traditional mushroom supplements (such as S41 or S44 or other formulations) may further enhance mushroom yields.

A typical specialty mushroom spawn formula (see example 1) contains approximately 6.0 to 6.5% (dry weight) nitrogen (Kjeldahl), although formulas with higher or lower nitrogen contents can be prepared. This nitrogen content is substantially higher than the approximately 2.3% (dry weight) nitrogen present in rye spawn and substantially higher than the 1.10 to 1.34% nitrogen typically present in Perlite spawn. Currently available mushroom supplements typically contain 5.6 to 9.6% (dry weight) nitrogen. Spawn as disclosed unexpectedly supports mushroom yields equivalent to or higher than those obtained with higher levels of grain spawn and supplement. For example, the spawn formulas described in the examples give the same yield when used at 4 to 5% as rye spawn at 3% plus 4% S41 or S44 supplement. The example 1 spawn formula delivers about the same total nitrogen to the compost as the standard rye grain plus supplement combination. The example 2 spawn delivers less than half of the nitrogen of the standard rye grain plus supplement combination. The spawn formulas in example 3 (formulas 68 and 78) deliver about 50% of the nitrogen as the standard rye spawn plus supplement combination.

While the phenomenon is not fullly understood, and speculation should not limit the scope of the claims, it is believed that the rapid colonization of the substrate resulting from the use of specialty mushroom spawn allows the mushroom mycelium to benefit more from the nutrients than the slower colonization of grain spawn and supplement. That is, rapid colonization allows the mushroom mycelium to absorb the nutrients. With a standard grain spawn and supplement combination in a non-sterile substrate, any competing microorganisms in the substrate utilize the nutrients to the detriment of mushroom fungus.

Points of inoculum: Specialty mushroom spawn as disclosed contains significantly more particles per unit weight than grain spawn. The mushroom spawn has at least 10,000 particles per 100 g, preferably at least 20,000 particles per 100 g, more preferably at least 30,000 particles per 100 g and most preferably at least 40,000 particles per 100 g.

Rye spawn typically contains about 1,500 kernels per 100 g (at 50% moisture content). Rye spawn has 79% of the particles between 3 and 4 mm in average size and 29% of the particles greater than 4 mm. The spawn taught by Brini & Sartor contains about 9,000 particles per 100 g. Specialty mushroom spawn (example 1 formula) is estimated to contain over 42,000 particles per 100 g (48% moisture content). It is difficult to accurately estimate the total number of particles because of their small size and large number. About 30% of the particles are smaller than 2.0 mm, and about 12% are smaller than 1.0 mm. The large increase in the number of points of inoculum results from the use of ingredients with low bulk densities and fine textures. The small particles are fully colonized with mycelium of the mushroom fungus. They more efficiently inoculate the mushroom substrate. Because of the larger number, the average distance between spawn particles is smaller than with rye spawn. Given that mushroom fungi have fixed linear growth rates, the distance the mycelium must grow to reach confluence is reduced. As a result, the time to achieve confluent growth through the substrate is also reduced. Completion of spawn run is generally defined as achievement of heavy, confluent growth throughout the substrate. Use of the spawn as disclosed therefore reduces the total spawn run time.

Principal nutrient source: The principal nutrient source is one that provides high levels of protein nitrogen. While corn gluten is a favored principal nutrient source, other ingredients may be substituted successfully. Corn gluten meal is the dried residue from corn after the removal of the larger part of the starch and germ, and the separation of the bran by the process employed in the wet milling manufacture of corn starch or syrup, or by enzymatic treatment of the endosperm. Corn gluten is water insoluble and hydrophilic, making it particularly suitable for use as a nutrient by a saprophytic fungus. Corn gluten is available from several sources, including Cargill, Inc. Corn gluten typically contains either 60% protein content (9.6% nitrogen) or 48% protein content (7.68% nitrogen). There is no apparent qualitative difference in performance using either 60% or 48% protein corn gluten. However, use of the 60% protein corn gluten allows the addition of higher nitrogen contents to a given specialty mushroom spawn formula.

Hydrolyzed feather meal is also a favored principal nutrient that can be used alone or in combination with corn gluten or other nutrient source. Feather meal is the product resulting from the treatment under pressure of clean, undecomposed feathers from slaughtered poultry. Feather meal typically contains 80–85% protein, with over 75% of the crude protein in a digestible form. Feathers contain a high content of keratin, a class of fibrous proteins found in vertebrate animals. Because of extensive cross linking of disulfide bonds, keratins are more resistant to hydrolysis than most other proteins. This resistance to hydrolysis makes keratin suitable for use as a nutrient by a saprophytic fungus. Keratin can absorb and hold water, but is generally insoluble in water and organic solvents.

Other principal nutrient sources that have been used successfully in preparing specialty mushroom spawn are listed in Table 2. The nutrients with the highest nitrogen contents are favored for use in the spawn, since they allow the highest possible total nitrogen content in the finished product. The nutrient sources generally contain protein nitrogen and may contain fats, oils, carbohydrates, and micronutrients. Persons skilled in the art could imagine many more possible nutrient sources. While an abundance of experimental data show that protein nitrogen is a favored nutrient source for mushrooms, other nutrients in the proper form and proportion could easily be defined by routine experimentation.

TABLE 2

Nutrient sources for specialty mushroom spawn

| NUTRIENT SOURCE | % NITROGEN |
| --- | --- |
| UREA | 42.00 |
| FEATHER MEAL | 15.30 |
| BLOOD MEAL | 14.38 |
| CORN GLUTEN | 11.00 |
| CONDENSED FISH SOLUBLES | 9.68 |
| DRIED ALGAE (SCENDESMUS) | 8.14 |
| PEANUT MEAL | 8.00 |
| SOYBEAN MEAL | 7.68 |
| YEAST SLUDGE | 7.65 |
| COTTONSEED MEAL | 7.50 |
| SAFFLOWER MEAL | 7.31 |
| CHEESE WHEY | 7.31 |
| SUNFLOWER MEAL | 7.16 |
| WHOLE CRACKED SOYBEANS | 6.40 |
| WHOLE SOYBEANS | 6.40 |
| CANOLA MEAL | 6.06 |
| LINSEED MEAL | 5.98 |
| DISTILLERS DRIED GRAIN | 4.75 |
| COTTONSEED WASTE | 3.89 |
| CORN STEEP LIQUOR | 3.65 |
| WHOLE CANOLA | 3.52 |
| ALFALFA | 2.96 |
| WHEAT BRAN | 2.75 |
| WHEAT FLOUR | 2.71 |
| CHICKEN LITTER | 2.70 |
| AMARANTH FLOUR | 2.58 |
| BONE MEAL | 2.45 |
| TURKEY LITTER | 2.20 |
| GRAPE PUMICE | 2.03 |
| SUNFLOWER HULLS | 1.84 |
| RYE FLOUR | 1.83 |
| PEANUT HULLS | 1.79 |
| BARLEY FLOUR | 1.76 |
| SOYBEAN HULLS | 1.62 |
| GROUND CORN | 1.53 |
| BLUE CORN MEAL | 1.48 |
| CORN FLOUR | 1.40 |
| YELLOW CORN MEAL | 1.26 |
| COTTONSEED HULLS | 0.64 |
| CORN STARCH | 0.11 |

Paper pellets: Paper pellets consist of a mixture of 53% shredded paper (newsprint or bond paper), 22% peat moss (<35% moisture), 17% proteinaceous material (soybean fines, etc.), 5.4% $CaCO_3$, and 1.6% $CaSO_4.2H_2O$. The mixture is pelleted to a ⅛" diameter cylinders at 160 to 180 F and a 40 lb/hour feed rate. By assuring that the peat moss ingredient has a moisture of <35%, the finished pellets have a moisture content of <12%, and therefore do not support mold growth. The material typically has a nitrogen content of 1.5 to 1.6%. Pelleting is done to improve the handling of the material. The pelleted material has a higher density and lower volume than unpelleted material and is well mixed. Pellets are hammer milled such that about 80% of the resulting fragments are <4.75 mm and >0.85 mm in size. The pellets fall apart after being hydrated to provide a larger number of small particles and "points of inoculum."

Particulate material: A particulate material such as calcined earth, perlite, vermiculite, or other ingredient is added to the specialty mushroom spawn formula to provide multiple points of inoculum, increase water holding capacity, aerate the mixtures, control the density of the mixture, and help to maintain a free flowing characteristic. Typical particulate ingredients include calcined earth, vermiculite, and perlite, but other particulate materials can be substituted successfully.

Calcined earth is a clay based material that is subjected to a calcination process. The clay is heated to a temperature below its melting point to bring about a state of thermal decomposition. The calcination process results in a porous material that readily absorbs water. Depending on the particle size, calcined earth can absorb at least 100% of its weight in water. Calcined earth is commercially available under the "Turface", "Oil Dri", and other brand names. Calcined earth is available in a range of particle sizes. Dry calcined earth has a density of approximately 598 g/l for the ⁸⁄₁₆ mesh size. Various particle sizes affect the density of the finished spawn product, and therefore are useful in formulating the product. The functional characteristics of calcined earth are similar regardless of the particle size. Smaller calcined earth particle sizes are perceived to be preferable in that they deliver more points of inoculum per unit weight.

Vermiculite is a hydrated magnesium-iron-aluminum silicate treated at high temperatures to cause expansion. The material has a low density (97 to 109 g/l), is water insoluble, and can absorb 200 to 500% of its weight in water.

Perlite is a volcanic glass material that is heated to cause its expansion and to improve its ability to hold moisture. It is typically used as a plant growth medium. It has a low density of about 109 g/l, and can absorb about 250% of its weight in water.

The selection of the appropriate particulate material for the specialty mushroom spawn formula is based on desired final product density, particle sizes, desired number of particles (points of inoculum), cost, ease of handling and use, and other characteristics. The spawn application equipment used by most mushroom growers is designed and optimized to deliver specific weights and volumes of grain spawn. High density materials such as calcined earth can be mixed with low density materials such as vermiculite and perlite to closely approximate the density of grain spawn in the finished spawn formula.

One beneficial characteristic of the particulate materials used in specialty mushroom spawn formulas is that they generally contain pores, hollows, and a rough texture. The mushroom mycelium grows into these pores, and is protected from damage due to abrasion as spawn is shaken during preparation or immediately prior to its being added to the substrate. In grain spawn, virtually all mycelial growth is on the surface of the kernels. When abraded, the surface mycelia are effectively scrubbed off, exposing the surface of the grain to potential contamination by competitor microorganisms. The protection from abrasion afforded by the rough texture of the particulate material makes the spawn resistant to the deleterious effect of shaking and abrasion.

The texture of the particulate materials is also of value in that the pores and hollows allow good aeration of the mixtures and help to avoid clumping of mixtures. Good aeration also helps in the sterilization process. Successful steam sterilization of a material requires that steam penetrate throughout the mass. A poorly aerated mixture restricts the penetration of steam. Dense clumps of material also restrict the penetration of steam. A failure of steam to penetrate the mixture results in cold spots that will not be successfully sterilized. The locally unsterilized areas of the mixtures reinoculate the substrate, resulting in contamination of the product. Sterilization failures are often due to the presence of bacterial spores, such as Bacillus spp. Bacillus contamination renders spawn unsuitable for use.

On occasion, a dense clump of a mixture achieves commercial sterility, but is not adequately colonized by the mushroom mycelium due to poor oxygen penetration. Mushroom fungi are strictly aerobic organisms. Poor oxygen availability in the center of a clump of unmixed material restricts the growth of the fungus in the clump. When the uncolonized clump is eventually blended with mushroom substrate, the nutrients can become available to microorganisms in a non-sterile substrate. The availability of the nutrients can result in the growth of competitor molds and high temperature in the substrate. Inclusion of a particulate material (i.e., calcined earth) in the specialty mushroom spawn fomnula reduces the formation of clumps in the mixtures and allows better oxygen penetration in the clumps that do form.

Inorganic components: $CaCO_3$ is added to the spawn formulas at up to about 7 to 8% of the total dry weight. This component helps to control the pH of the spawn through a buffering effect. Mushroom fungi typically release organic acids during growth. Inclusion of $CaCO_3$ in the formula avoids a significant reduction in pH during growth. Spawn formulas typically have a pH of about 7.2 immediately before being inoculated when made with tap water. The pH of the finished product is typically about pH 6.7. The exact content of $CaCO_3$ does not appear to be critical.

$CaSO4.2H_2O$ (gypsum) may be added to the spawn formulas at up to about 7 to 8% of the total dry weight. The $CaSO_4$ appears to coat the outside of the particles to avoid clumping and make any lumps that do form easier to break up. The $CaSO_4$ is an optional, but desirable, component of the formula. $CaSO_4$ and $CaCO_3$ may be premixed in a 1:1 mixture to simplify addition of the ingredients.

Water/moisture content: The optimum moisture content for specialty mushroom spawn varies with the genus and species being cultivated. While rye and millet spawns generally lose moisture during sterilization and growth, specialty mushroom spawn does not lose a significant amount of moisture due to evaporation. Therefore, most formulas are adjusted to the proper target moisture prior to sterilization with no allowance for moisture loss. This moisture content allows vigorous growth of the mushroom mycelium in the spawn and optimum performance in the substrate. By avoiding the need for compensatory water in the formula, the lower moisture content also helps to prevent the formation of clumps and allows better oxygen penetration into the mixtures. This helps to prevent sterilization failure and uncolonized areas of the final product.

Preparation: Specialty mushroom spawn mixtures are prepared by placing dry ingredients in a large mixing container such as a paddle mixer, cement mixer, ribbon blender, or other suitable container in which the mixtures can be blended to obtain homogeneity. Ingredients are weighed, placed in the mixer, and mixed until thoroughly blended. Sufficient water is added as a fine spray to bring the mixtures to the optimum moisture for the mushroom being cultivated. Additional mixing after the addition of water reduces any clumping that may occur.

Polycarbonate jars (160 oz. total capacity) are filled with 6.2 lb of the hydrated mixtures. This weight of a standard spawn formula (i.e., formula 83) fills the jars to approximately 75 to 80% of capacity. Some formulas are denser than formula 83. With denser formulas, the jars contain less total volume. Jars are filled either manually or with an automated jar filling machine. Jars are capped with lids containing a breathable filter element that allows the passage of air and steam but prevents the passage of microorganisms that would contaminate the finished product. The mixtures are steam sterilized at times and temperatures needed to achieve commercial sterility. This is typically 255 F. for 150 minutes. Following sterilization, mixtures are cooled to less than 80 F. Jars are briefly opened under aseptic conditions, and an inoculum is added. The inoculum may consist of millet or rye grain colonized with a suitable strain of the specific fungus, and is added to jars at about 1.1 to 1.3% (vol/vol). Mixtures may also be inoculated with non-grain substrates colonized with the specified mycelium (U.S. Pat. No. 5,503,647) or with formulations made from the present invention at similar inoculation rates. Immediately following inoculation, jars are briefly shaken in a modified commercial paint shaker to distribute the inoculum throughout the mixture and to break up any lumps that may have formed during sterilization. Jars are incubated for times and temperatures appropriate for the mushroom type being cultivated. About halfway through the growth period, jars are again shaken to evenly distribute the growing mycelium. After the remaining growth period, the mixtures are evenly colonized with mushroom mycelium. The spawn can be used immediately, or can be stored in the jars under refrigerated conditions (less than 38 to 40 F.). Alternatively, the contents of the jars can be transferred to ventilated plastic bags and stored pending use. Packaged mushroom spawn, including the presently disclosed spawn, is typically stored at less than 42 F. for approximately 14 to 21 days to allow the "regrowth" of the mycelium and the development of an even white color associated with heavy mycelial colonization. Note that some fungi (i.e., some Pleurotus species, Volvariella, and others) are harmed by reduced temperatures. Spawn made from cold-sensitive types must be stored at warmer temperatures and/or used immediately.

While the above description describes the method of specialty mushroom spawn preparation used by the inventors, persons with ordinary skill could easily prepare spawn formulas by other methods used for spawn production. These methods include, but are not limited to, the methods described above (Background of the Invention).

Use of Spawn: Specialty mushroom spawn is used in a manner similar to standard grain, sawdust or Perlite spawns and mushroom spawn plus supplement combinations. Details of use are familiar to those skilled in the art of growing mushrooms.

Other Uses: While this invention as disclosed was developed to efficiently grow large amounts of mushroom mycelium and inoculate mushroom growing substrates, other uses would be obvious to those skilled in the art of inoculating microorganisms into solid substrates. Such uses include inoculating mycorrhizal fungi into soils or seedling mixtures, inoculating various fungi into solid substrate fermentation systems, distributing biological control agents to target environments, and other uses.

EXAMPLE

Example 1
Formula 83

| | |
|---|---|
| Corn Gluten (60% protein) | 30.2 g |
| Paper Pellets | 14.5 g |
| Calcined Earth (8/16 mesh) | 29.1 g |
| Feather Meal (15.4% nitrogen) | 17.4 g |
| CaCO$_3$ | 8.7 g |
| Water | 75.6 ml |

The nitrogen content of this formula is 6.39%.

Example 2
Formula 80

| | |
|---|---|
| Corn Gluten (60% protein) | 30.3 g |
| Paper Pellets | 22.4 g |
| Vermiculite | 19.4 g |
| Calcined Earth | 18.8 g |
| CaCO$_3$ | 9.1 g |
| Water | 78.8 ml |

The nitrogen content of this formula is 3.54%.

Example 3
Formula 68

| | |
|---|---|
| Rye Grain | 27.8 g |
| Corn Gluten (60% protein) | 27.8 g |
| Paper Pellets | 27.8 g |
| Vermiculite | 8.3 g |
| CaCO$_3$ | 8.3 g |
| Water | 75 ml |

The nitrogen content of formula 68 is 4.16%.

Example 4
Formula 78

| | |
|---|---|
| Rye grain | 23.1 g |
| Corn Gluten (60% protein) | 17.0 g |
| Paper Pellets | 23.1 g |
| Wheat Bran | 23.1 g |
| Vermiculite | 6.9 g |
| CaCO$_3$ | 6.9 g |
| Water | 73.7 ml |

The nitrogen content of formula 78 is 4.27%.

Example 5

| Formula 83b | Grams |
|---|---|
| Corn Gluten | 30.2 |
| Paper Pellets | 14.5 |
| Calcined Earth | 29.1 |
| Feather Meal | 17.4 |
| CaCO$_3$/CaSO$_4$ (1:1) | 8.7 |
| Water | 75.6 |
| % Nitrogen (Calc) | 6.39% |
| % Moisture (Calc) | 48.23% |

Example 6

| Formula 80b | Grams |
|---|---|
| Corn Gluten | 30.3 |
| Paper Pellets | 22.4 |
| Vermiculite | 19.4 |
| Calcined Earth | 18.8 |
| CaCO$_3$/CaSO$_4$ (1:1) | 9.1 |
| Water | 78.8 |
| % Nitrogen (Calc) | 3.54% |
| % Moisture (Calc) | 48.78% |

Example 7

| Formula 80c-2 | Grams |
|---|---|
| Corn Gluten (60%) | 8.0 |
| Paper Pellets | 33.6 |
| Vermiculite | 32.8 |
| Calcined Earth | 13.6 |
| CaCO$_3$ | 12.0 |
| Water | 80 |
| % Nitrogen (Calc) | 1.38% |
| % Moisture (Calc) | 48.64% |

Example 8

| Formula 80c-16 | Grams |
|---|---|
| Corn Gluten (60%) | 63.5 |
| Paper Pellets | 13.3 |
| Vermiculite | 13.0 |
| Calcined Earth | 5.4 |
| CaCO$_3$ | 4.8 |
| Water | 73.0 |
| % Nitrogen (Calc) | 7.01% |
| % Moisture (Calc) | 48.12% |

Example 9

| Formula 80d | Grams |
|---|---|
| Corn Gluten (60%) | 33.3 |
| Paper Pellets | 22.4 |
| Vermiculite | 18.2 |
| Calcined Earth | 17.0 |
| CaCO$_3$ | 9.1 |
| Water | 78.8 |
| % Nitrogen (Calc) | 3.87% |
| % Moisture (Calc) | 48.89% |

Example 10

| Formula 80d-4 | Grams |
|---|---|
| Corn Gluten (60%) | 78.4 |
| Paper Pellets | 7.3 |
| Vermiculite | 5.9 |
| Calcined Earth | 5.5 |
| CaCO$_3$ | 2.9 |
| Water | 72.5 |
| % Nitrogen (Calc) | 8.57% |
| % Moisture (Calc) | 48.37% |

Example 11

| Formula 80d-4 | Grams |
|---|---|
| Feather Meal (80%) | 69.4 |
| Paper Pellets | 10.3 |
| Vermiculite | 8.3 |
| Calcined Earth | 7.8 |
| CaCO$_3$ | 4.2 |
| Water | 72.2 |
| % Nitrogen (Calc) | 10.10% |
| % Moisture (Calc) | 48.01% |

Example 12

| Formula 80e-7 (P55) | Grams |
|---|---|
| Linseed Meal | 51.1 |
| Paper Pellets | 15.7 |
| Vermiculite | 13.2 |
| Calcined Earth | 13.6 |
| CaCO$_3$ | 6.4 |

-continued

| | |
|---|---|
| Water | 74.5 |
| % Nitrogen (Calc) | 3.63% |
| % Moisture (Calc) | 48.66% |

Example 13

| Formula 83 (P57) | Grams |
|---|---|
| Corn Gluten | 30.3 |
| Paper Pellets | 22.4 |
| Calcined Earth | 20.0 |
| Feather Meal | 18.2 |
| CaCO$_3$ | 9.1 |
| Water | 78.8 |
| % Nitrogen (Calc) | 6.58% |
| % Moisture (Calc) | 48.78% |

Example 14

| Formula 83-C5 (P57) | Grams |
|---|---|
| Cottonseed Waste | 30.3 |
| Paper Pellets | 22.4 |
| Calcined Earth | 20.0 |
| Feather Meal | 18.2 |
| CaCO$_3$ | 9.1 |
| Water | 78.8 |
| % Nitrogen (Calc) | 4.69% |
| % Moisture (Calc) | 48.78% |

Example 15

| Formula 83-s5 (P59) | Grams |
|---|---|
| Whole Soybeans | 51.1 |
| Paper Pellets | 15.7 |
| Calcined Earth | 14.0 |
| Feather Meal | 12.8 |
| CaCO$_3$ | 6.4 |
| Water | 76.6 |
| % Nitrogen (Calc) | 6.03% |
| % Moisture (Calc) | 48.74% |

Example 16

| Formula 83-c3 (P59) | Grams |
|---|---|
| Cottonseed Meal | 46.5 |
| Paper Pellets | 17.2 |
| Calcined Earth | 15.3 |
| Feather Meal | 14.0 |
| CaCO$_3$ | 7.0 |
| Water | 76.7 |
| % Nitrogen (Calc) | 6.48% |
| % Moisture (Calc) | 48.66% |

Example 17

| Formula 83-c4 (P59) | Grams |
|---|---|
| Ground Corn | 54.5 |
| Paper Pellets | 13.5 |
| Calcined Earth | 12.0 |
| Feather Meal | 14.5 |
| CaCO$_3$ | 5.5 |
| Water | 76.4 |
| % Nitrogen (Calc) | 3.61% |
| % Moisture (Calc) | 48.74% |

Example 18

| Formula 83-sh2 (P61) | Grams |
|---|---|
| Soybean Hulls | 30.3 |
| Paper Pellets | 22.4 |
| Calcined Earth | 20.0 |
| Feather Meal | 18.2 |
| CaCO$_3$ | 9.1 |
| Water | 78.8 |
| % Nitrogen (Calc) | 3.94% |
| % Moisture (Calc) | 48.78% |

Example 19

| Formula P69-1 | Grams |
|---|---|
| Feather Meal | 16.5 |
| Corn Gluten | 24.8 |
| Calcined Earth | 33.9 |
| Paper Pellets | 16.5 |
| CaCO$_3$ | 8.3 |
| Water | 78.4 |
| % Nitrogen (Calc) | 5.58% |
| % Moisture (Calc) | 48.23% |

Example 20

| Formula P69-2 | Grams |
|---|---|
| Feather Meal | 24.8 |
| Corn Gluten | 16.5 |
| Calcined Earth | 33.9 |
| Paper Pellets | 16.5 |
| CaCO$_3$ | 8.3 |
| Water | 78.4 |
| % Nitrogen (Calc) | 6.09% |
| % Moisture (Calc) | 48.23% |

Example 21

| Formula P71-3 | Grams |
|---|---|
| Peanut Hulls | 53.6 |
| Paper Pellets | 8.9 |
| Calcined Earth | 17.9 |
| Feather Meal | 14.3 |
| CaCO$_3$ | 5.4 |
| Water | 75.0 |
| % Nitrogen (Calc) | 3.61% |
| % Moisture (Calc) | 48.12% |

Example 22

| Formula P71-4 | Grams |
|---|---|
| Bone Meal | 55.6 |
| Paper Pellets | 9.3 |
| Calcined Earth | 18.5 |
| Feather Meal | 11.1 |
| CaCO$_3$ | 5.6 |
| Water | 75.9 |
| % Nitrogen (Calc) | 3.53% |
| % Moisture (Calc) | 48.48% |

Example 23

| Formula P73-w4 | Grams |
|---|---|
| Wheat Flour | 55.6 |
| Paper Pellets | 9.3 |
| Calcined Earth | 18.5 |
| Feather Meal | 11.1 |
| CaCO$_3$ | 5.6 |
| Water | 75.9 |
| % Nitrogen (Calc) | 3.69% |
| % Moisture (Calc) | 48.48% |

Example 24

| Formula P73-cs4 | Grams |
|---|---|
| Corn Starch | 50.0 |
| Paper Pellets | 8.3 |
| Calcined Earth | 16.7 |
| Feather Meal | 20.0 |
| CaCO$_3$ | 5.0 |

-continued

| | Grams |
|---|---|
| Water | 230 |
| % Nitrogen (Calc) | 3.50% |
| % Moisture (Calc) | 48.45% |

Example 25

| Formula P73-bf4 | Grams |
|---|---|
| Barley Flour | 53.6 |
| Paper Pellets | 8.9 |
| Calcined Earth | 17.9 |
| Feather Meal | 14.3 |
| $CaCO_3$ | 5.4 |
| Water | 73.2 |
| % Nitrogen (Calc) | 3.59% |
| % Moisture (Calc) | 47.59% |

Example 26

| Formula P83-cf8 | Grams |
|---|---|
| Corn Flour | 62.5 |
| Paper Pellets | 6.3 |
| Calcined Earth | 12.5 |
| Feather Meal | 15.0 |
| $CaCO_3$ | 3.8 |
| Water | 75.0 |
| % Nitrogen (Calc) | 3.61% |
| % Moisture (Calc) | 48.40% |

Example 27

| Formula P75-yc4 | Grams |
|---|---|
| Yellow Corn Meal | 43.5 |
| Paper Pellets | 10.9 |
| Calcined Earth | 21.7 |
| Feather Meal | 17.4 |
| $CaCO_3$ | 6.5 |
| Water | 78.0 |
| % Nitrogen (Calc) | 3.69% |
| % Moisture (Calc) | 48.66% |

Example 28

| Formula P75-bc4 | Grams |
|---|---|
| Blue Cornmeal | 43.5 |
| Paper Pellets | 10.9 |
| Calcined Earth | 21.7 |
| Feather Meal | 17.4 |
| $CaCO_3$ | 6.5 |
| Water | 78.0 |
| % Nitrogen (Calc) | 3.79% |
| % Moisture (Calc) | 48.66% |

Example 29

| Formula P75-rf4 | Grams |
|---|---|
| Rye Flour | 53.6 |
| Paper Pellets | 8.9 |
| Calcined Earth | 17.9 |
| Feather Meal | 14.3 |
| $CaCO_3$ | 5.4 |
| Water | 75.0 |
| % Nitrogen (Calc) | 3.63% |
| % Moisture (Calc) | 48.12% |

Example 30

| Formula P75-pm2 | Grams |
|---|---|
| Peanut Meal | 29.4 |
| Paper Pellets | 14.7 |
| Calcined Earth | 29.4 |
| Feather Meal | 17.6 |
| $CaCO_3$ | 8.8 |
| Water | 79.4 |

-continued

| | Grams |
|---|---|
| % Nitrogen (Calc) | 5.72% |
| % Moisture (Calc) | 48.62% |

Example 31

| Formula P87-rf | Grams |
|---|---|
| Rye Flour | 64.1 |
| Paper Pellets | 6.4 |
| Calcined Earth | 12.8 |
| Feather Meal | 12.8 |
| $CaCO_3$ | 3.8 |
| Water | 74.4 |
| % Nitrogen (Calc) | 3.58% |
| % Moisture (Calc) | 48.28% |

Example 32

| Formula P87-wf | Grams |
|---|---|
| Wheat Flour | 63.4 |
| Paper Pellets | 7.6 |
| Calcined Earth | 15.2 |
| Feather Meal | 9.1 |
| $CaCO_3$ | 4.6 |
| Water | 76.2 |
| % Nitrogen (Calc) | 3.58% |
| % Moisture (Calc) | 48.83% |

Example 33

| Formula P87-bf | Grams |
|---|---|
| Barley Flour | 64.1 |
| Paper Pellets | 6.4 |
| Calcined Earth | 12.8 |
| Feather Meal | 12.8 |
| $CaCO_3$ | 3.8 |
| Water | 74.4 |
| % Nitrogen (Calc) | 3.53% |
| % Moisture (Calc) | 48.28% |

Example 34

| Formula P87-yc | Grams |
|---|---|
| Yellow Corn Meal | 51.7 |
| Paper Pellets | 8.6 |
| Calcined Earth | 17.2 |
| Feather Meal | 17.2 |
| $CaCO_3$ | 5.2 |
| Water | 75.9 |
| % Nitrogen (Calc) | 3.76% |
| % Moisture (Calc) | 48.29% |

Example 35

| Formula P87-bc | Grams |
|---|---|
| Blue Corn Meal | 58.8 |
| Paper Pellets | 7.4 |
| Calcined Earth | 14.7 |
| Feather Meal | 14.7 |
| $CaCO_3$ | 4.4 |
| Water | 76.5 |
| % Nitrogen (Calc) | 3.57% |
| % Moisture (Calc) | 48.72% |

Example 36

| Formula P89-83b | Grams |
|---|---|
| Feather Meal | 20.0 |
| Corn Gluten | 30.0 |
| Calcined Earth | 20.0 |
| Paper Pellets | 20.0 |
| $CaCO_3$ | 10.0 |

-continued

|  |  |
|---|---|
| Water | 77.9 |
| % Nitrogen (Calc) | 6.80% |
| % Moisture (Calc) | 48.40% |

Example 37

| Formula P89-83b-3 | Grams |
|---|---|
| Feather Meal | 20.0 |
| Corn Gluten | 30.0 |
| Calcined Earth | 20.0 |
| Paper Pellets | 16.6 |
| $CaCO_3$ | 10.0 |
| Enhanced Oat Fiber | 3.4 |
| Water | 71.1 |
| % Nitrogen (Calc) | 6.99% |
| % Moisture (Calc) | 48.24% |

REFERENCES

Chang, S. T. & W. A. Hayes. 1978. The Biology and Cultivation of Edible Mushrooms. Academic Press, New York. 819 pp.

Chang, S. T. & P. G. Miles. 1989. Edible Mushrooms and Their Cultivation. CRC Press. Boca Raton, Fl. 345 pp.

Fritsche, G. 1978. "Breeding Work." Chapter 10, pages 239–250, In: Chang, S. T. & W. A. Hayes, Eds. "The Biology and Cultivation of Edible Mushrooms." Academic Press, N.Y.

Lemke, G. 1971. Erfahrungen mit Perlite bei der Myzelanzucht und Fruchtkorperproduktion des Kulturchampgnons *Agaricus bisporus* (Lge.) Sing. Gartenbauwissenschaft 1:19–27.

Royse, D. J. 1997. Specialty Mushrooms and their cultivation. pp. 59–97, In: J. Janick (ed.), Horticultural Reviews (Vol. 19), John Wiley & Sons, New York, N.Y.

Stamets, P. & J. S. Chilton. 1983. The Mushroom Cultivator. Agarikon Press, Olympia, Wa. 415 pp.

What is claimed is:

1. A specialty mushroom spawn comprising a mixture of: (a) at least one proteinaceous ingredient in an amount to provide in the specialty mushroom spawn at least 3.5% nitrogen on a dry weight basis; (b) 2 to 30 wt % based on dry weight of paper pellets; (c) 5 to 60 wt % based on dry weight of at least one particulate material; (d) a buffer in an amount effective to provide a pH of about 6 to 7.8; and (e) water; and colonized with mushroom mycelium wherein the (b) paper pellets, (c) particulate material, or both are present in an amount effective to provide at least 20,000 particles per 100 g of finished product.

2. The mushroom spawn of claim 1 wherein the proteinaceous ingredient is selected from the group consisting of corn gluten, feather meal, cracked soybeans, soybean meal, cottonseed meal, and mixtures thereof.

3. The mushroom spawn of claim 2 wherein the proteinaceous ingredient is corn gluten.

4. The mushroom spawn of claim 1 further comprising at least one oleaginous ingredient.

5. The mushroom spawn of claim 4 wherein the oleaginous ingredient is selected from the group consisting of cracked soybeans, soybean fines, sunflowers, cracked sunflowers, and corn oil.

6. The mushroom spawn of claim 1 wherein the particulate materials are selected from the group consisting of calcined earth, vermiculite, perlite, and mixtures thereof.

7. The mushroom spawn of claim 1 further comprising (f) gypsum in an amount effective to reduce clumping.

8. The mushroom spawn of claim 1 comprising on a dry weight basis: 5 to 80 wt % of the proteinaceous ingredient, 2 to 30 wt % of the paper pellets, 5 to 60 wt % of the particulate material, 1 to 12 wt % $CaCO_3$, and between 40 and 54% water.

9. The mushroom spawn of claim 8 further comprising 1 to 10 wt % $CaSO_4$.

10. The mushroom spawn of claim 8 comprising 6 to 9 wt % $CaCO_3$.

11. The mushroom spawn of claim 1 wherein 80% of the paper pellets have a size of between about 0.85 and 4.75 mm.

12. The mushroom spawn of claim 5 further comprising 1 to 50 wt % grain.

13. The mushroom spawn of claim 1 wherein the moisture content is between about 46 and 52%.

14. The mushroom spawn of claim 13 wherein the moisture content is between about 48 and 50%.

15. The mushroom spawn of claim 1 wherein the proteinaceous ingredients are present in an amount to provide between about 6 and 6.5% nitrogen on a dry weight basis.

16. The mushroom spawn of claim 1 wherein the buffer is calcium carbonate.

17. The mushroom spawn of claim 1 wherein the pH is between 6.2 and 7.4.

18. The mushroom spawn of claim 1 wherein the (b) paper pellets, (c) particulate material, or both are present in an amount effective to provide at least 30,000 particles per 100 g of finished product.

19. The mushroom spawn of claim 18 wherein the (b) paper pellets, (c) particulate material, or both are present in an amount effective to provide at least 40,000 particles per 100 g of finished product.

20. Mushroom substrate comprising between 1 and 8% of fresh weight mushroom spawn of claim 1 based on the dry weight of the substrate.

21. The mushroom substrate of claim 20 comprising between 4 and 5% of fresh weight of the mushroom spawn.

22. The mushroom substrate of claim 20 further comprising 1 to 6 wt % additional mushroom supplements.

23. The mushroom substrate of claim 22 further comprising about 2 wt % additional mushroom supplements.

24. A method of reducing or eliminating mold comprising inoculating a substrate with the mushroom spawn of claim 1.

25. The method of claim 24 wherein the mold is green mold disease.

26. A method of preparing specialty spawn comprising colonizing a mixture of: (a) at least one proteinaceous ingredient in an amount to provide in the specialty spawn at least 3.5% nitrogen on a dry weight basis; (b) 2 to 30 wt % based on dry weight of paper pellets; (c) 5 to 60 wt % based on dry weight of at least one particulate material; (d) a buffer in an amount effective to provide a pH of about 6 to 7.8; and (e) water; with mushroom mycelium wherein the (b) paper pellets, (c) particulate material, or both are present in an amount effective to provide at least 20,000 particles per 100 g of finished product.

27. The method of claim 26 further comprising (f) gypsum in an amount effective to reduce clumping.

28. The method of claim 26 wherein the (b) paper pellets, (c) particulate material, or both are present in an amount effective to provide at least 30,000 particles per 100 g of finished product.

29. The method of claim 26 wherein the buffer is calcium carbonate.

30. The method of claim 26 wherein the pH is between 6.2 and 7.4

31. A specialty mushroom spawn comprising a mixture of: (a) at least one proteinaceous ingredient in an amount to provide in the specialty mushroom spawn at least 1% nitrogen on a dry weight basis; (b) 2 to 30 wt % based on dry weight of paper pellets; (c) 5 to 60 wt % based on dry weight of at least one particulate material; (d) a buffer in an amount effective to provide a pH of about 6 to 7.8; and (e) water; and colonized with mushroom mycelium wherein the (b) paper pellets, (c) particulate material, or both are present in an amount effective to provide at least 20,000 particles per 100 g of finished product.

32. The mushroom spawn of claim 31 wherein the (b) paper pellets, (c) particulate material, or both are present in an amount effective to provide at least 30,000 particles per 100 g of finished product.

* * * * *